United States Patent
Brennan et al.

(10) Patent No.: US 12,260,494 B2
(45) Date of Patent: Mar. 25, 2025

(54) SPATIAL TEST OF BOUNDING VOLUMES FOR RASTERIZATION

(71) Applicant: ADVANCED MICRO DEVICES, INC., Santa Clara, CA (US)

(72) Inventors: Christopher J. Brennan, Boxborough, MA (US); Matthaeus G. Chajdas, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 159 days.

(21) Appl. No.: 17/957,565

(22) Filed: Sep. 30, 2022

(65) Prior Publication Data

US 2024/0112397 A1   Apr. 4, 2024

(51) Int. Cl.
*G06T 15/30* (2011.01)

(52) U.S. Cl.
CPC .......... *G06T 15/30* (2013.01); *G06T 2210/12* (2013.01); *G06T 2210/21* (2013.01)

(58) Field of Classification Search
CPC ..... G06T 15/30; G06T 15/40; G06T 2210/12; G06T 2210/21
See application file for complete search history.

(56) References Cited

U.S. PATENT DOCUMENTS

| | | | | |
|---|---|---|---|---|
| 4,862,392 A | * | 8/1989 | Steiner | G06T 15/06 345/506 |
| 6,774,895 B1 | * | 8/2004 | Papakipos | G06T 15/30 345/422 |
| 2006/0164414 A1 | * | 7/2006 | Farinelli | G06T 15/40 345/422 |
| 2011/0316855 A1 | | 12/2011 | Mejdrich et al. | |
| 2015/0317825 A1 | | 11/2015 | Hazel | |
| 2018/0253884 A1 | * | 9/2018 | Burnett, III | H04N 13/351 |
| 2019/0035139 A1 | * | 1/2019 | Zimmerman | G06T 15/06 |
| 2020/0051310 A1 | * | 2/2020 | Zimmerman | G06T 15/506 |
| 2020/0193675 A1 | | 6/2020 | Burnett et al. | |

FOREIGN PATENT DOCUMENTS

KR   1020100128337   12/2010

OTHER PUBLICATIONS

International Search Report and Written Opinion mailed Jan. 16, 2024 for PCT/US2023/033474, 11 pages.
U.S. Appl. No. 18/205,407, filed Jun. 2, 2023, listing Christopher J. Brennan et al. as inventors, entitled "Sort-Top Rasterization and Tile Rendering Using an Acceleration Structure", 36 pages.

* cited by examiner

*Primary Examiner* — Diane M Wills (57) ABSTRACT

In response to receiving a scene description, a processing system generates a set of planes in the scene and a bounding volume representing a partition of the scene. Using the set of planes in the scene, a compute unit of an accelerated processing unit performs a spatial test on the bounding volume to determine whether the bounding volume intersects one or more planes of the set of planes in the scene. Based on the spatial test, the compute unit generates intersection data indicating whether the bounding volume intersects one or more planes of the set of planes in the scene. The accelerated processing unit then uses the intersection data to render the scene.

19 Claims, 7 Drawing Sheets

SPATIAL TEST OF BOUNDING VOLUMES FOR RASTERIZATION

BACKGROUND

To support rasterization processes for a scene, processing systems often implement various visibility techniques to determine which primitives in a scene to rasterize. For such visibility techniques, processing systems determine which primitives are visible in a scene based on a first set of data structures representing the scene. Based on the primitives that are visible in the scene, the processing system identifies which primitives to rasterize. Similarly, to support ray tracing processes for the scene, processing systems often rely on one or more acceleration structures. An acceleration structure includes, for example, a bounding volume hierarchy (BVH), which is a tree structure representing a set of geometric objects (e.g., triangles or other primitives) within the scene to be rendered. Within the acceleration structure, the geometric objects are enclosed in bounding boxes or other bounding volumes that form leaf nodes of the tree structure, and then these nodes are grouped into small sets, with each set enclosed in their own bounding volumes that represent a parent node on the tree structure, and these small sets then are bound into larger sets that are likewise enclosed in their own bounding volumes that represent a higher parent node on the tree structure, and so forth, until there is a single bounding volume representing the top node of the tree structure and which encompasses all lower-level bounding volumes. However, maintaining the respective data structures for rasterization and acceleration structures for ray tracing increases the amount of memory needed by the processing system to render the scene, potentially causing increased processing times and decreased processing efficiency for the processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

To render a scene, a processing system (e.g., accelerated processing unit (APU), central processing unit (CPU)) first receives a command stream including one or more draw calls each indicating one or more primitives of the scene to be rendered. The processing system then implements one or more stages of a graphics pipeline (e.g., an assembler stage, vertex shader stage, hull shader stage, tessellator stage, domain shader stage, geometry shader stage) to generate a data structure representing one or more primitives, objects, or both within the scene as indicated in the draw calls of the command stream. Based on these data structures, the processing system supports rasterization of the scene by, for example, determining which primitives, objects or both are visible in the scene. To determine which primitives, objects, or both are visible in the scene, the processing system performs one or more spatial tests (e.g., plane tests, frustum tests) on the data structures. To perform such spatial tests (e.g., plane tests, frustum tests), the processing system first receives a set of plane equations. Using these plane equations, the processing system generates one or more sets of planes in the scene, one or more frustums for specific views inside the scene, or both. As an example, the processing system generates a frustum of a scene that includes two or more planes forming an unbounded shape (e.g., unbounded prism, unbounded rectangular pyramid, unbounded triangular pyramid) within the scene (e.g., at a location in the scene). The processing system then performs a plane test, frustum test, or both of one or more portions of the data structure to determine, for example, if one or more primitives represented in the data structure intersect with one or more planes of a set of planes in the scene, if one or more primitives represented in the data structure are at least partially within a frustum of the scene, or both. Based on the plane tests and frustum tests (e.g., spatial tests), the processing system generates intersection data identifying, for example, if one or more planes of a set of planes in a scene intersect with one or more primitives represented in a data structure, whether one or more primitives represented in a data structure are at least partially within a frustum of the scene, whether one or more primitives represented in a data structure are fully within a frustum of the scene, or any combination thereof. Based on the intersection data, the processing system identifies which primitives, objects, or both are visible in the scene, which draw calls include one or more visible primitives or objects, which primitives, objects, or both to rasterize, or any combination thereof. As an example, based on the intersection data, the processing system identifies which primitives, objects, or both are visible in a scene (e.g., those primitives, objects, or both that are least partially within a frustum) and determines which draw calls to execute for the scene based on the identified visible primitives, objects, or both (e.g., determines to execute only draw calls including one or more visible primitives, objects, or both to render the scene).

Additionally, to help render a scene, the processing system is configured to generate one or more bounding volumes based on the scene geometry. Such bounding volumes, for example, each represents a partition (e.g., closed volume) of at least a portion of the scene that contains one or more primitives, objects, or both of the scene and includes, for example, an axis-aligned bounding box (AABB), oriented bounding box (OBB), bounding shape (e.g., capsule, cylinder, ellipsoid, sphere, slab, triangle), or discrete oriented polytope (DOP), to name a few. As an example, to support ray tracing of a scene, the processing system generates acceleration structures each including one more bounding volumes based on the scene. An acceleration structure includes, for example, a data structure that has two or more nodes (e.g., boxes, leaves) with each node representing a bounding volume (e.g., a partition of at least a portion of the scene that contains one or more primitives, objects, or both within that portion of the scene). For example, an acceleration structure includes a bounding volume hierarchy (BVH), binary space partitioning (BSP) tree, k-dimensional tree, or R-tree, to name a few. After generating one or more acceleration structures, the processing system performs a ray traversal of one or more of the acceleration structures to determine one or ray states of rays as they traverse the acceleration structures. Such ray states are then used to render the primitives, objects, or both indicated in the scene geometry, perform physics calculations (e.g., physics simulations) for physics engines, perform lighting calculations for lighting engines, or any combination thereof. However, due to the processing system maintaining both the data structures to support rasterization and the acceleration structures for ray tracing, the resources and memory needed by the processing system to render the scene are increased.

To help reduce the resources and memory used by the processing system to render a scene, techniques and systems disclosed herein are directed to performing one or more spatial tests (e.g., plane tests, frustum tests, or both) of a bounding volume using a compute unit (e.g., processing core, thread, single instruction, multiple data (SIMD) unit) of the processing system. To perform a spatial test of a bounding volume using the compute unit, the processing system first receives a scene description indicating, for example, one or more primitives of a scene, scene geometry, scene layout, or any combination thereof. Based on the scene description, the processing system generates one or more bounding volumes each representing a partition of a scene that contains one or more primitives, objects, or both of the scene. For example, the processing system generates one or more acceleration structures each including one or more bounding volumes. Additionally, to perform a spatial test (e.g., plane test, frustum test, or both) of a bounding volume, the processing system is configured to generate one or more sets of planes in a scene, a frustum for a specific view inside the scene, or both based on one or more plane equations. Each set of planes in the scene, for example, includes one or more planes in the scene and each frustum for a specific view inside the scene, for example, includes two or more planes defining an unbounded shape (e.g., rectangular pyramid, triangular pyramid) in the scene. After the processing system generates the sets of planes in the scene, frustums of the scene, or both, a compute unit (e.g., processing core, thread, SIMD unit) of the processing system then performs plane tests, frustum tests, or both of one or more of the bounding volumes. Each plane test of a bounding volume, for example, includes an operation in which the compute unit determines if one or more planes of a set of planes in the scene intersect with the bounding volume. Each frustum test of a bounding volume, for example, includes an operation in which the compute unit determines whether the bounding volume is at least partially within the frustum, in the scene wholly within the frustum in the scene, partially outside the frustum in the scene, wholly outside the frustum in the scene, or any combination thereof.

For each plane test of a bounding volume, in response to the compute unit determining that a bounding volume intersects with one or more planes of a set of planes in a scene, the compute unit generates intersection data indicating whether the bounding volume intersects with one or more planes of a set of planes in the scene. Similarly, for each frustum test of a bounding volume, in response to the compute unit determining that the bounding volume is at least partially within a frustum of the scene, wholly within the frustum of the scene, partially outside the frustum of the scene, or wholly outside the frustum of the scene, the compute unit generates intersection data indicating whether the bounding volume is at least partially within the frustum of the scene, wholly within the frustum of the scene, partially outside the frustum of the scene, or wholly outside the frustum of the scene. After generating intersection data, the compute unit provides the intersection data to an output buffer where it is made available, for example, to a shader program, to help render one or more primitives, perform one or more physics operations for a physics engine, perform one or more lighting operations for a lighting engine, or any combination thereof, to name a few. For example, the processing system uses the intersection data to determine which primitives are visible in the scene (e.g., primitives contained in a bounding volume that is at least partially within a frustum), which primitives are to be rasterized (e.g., primitives that are in a bounding volume that is wholly within a frustum), which primitives in the scene are hidden (e.g., primitives contained in a bounding volume that is wholly not within a frustum), or any combination thereof. In this way, a compute unit of the processing system is configured to perform a spatial test (e.g., a plane test, a frustum test, or both) of a bounding volume. As such, the processing system determines visibility data, physics data, and lighting data by performing frustum tests of bounding volumes from, for example, acceleration structures (e.g., shared acceleration structures) rather than other data structures, helping reducing the amount of memory and resources used by the processing system to render a scene.

Figure 1:
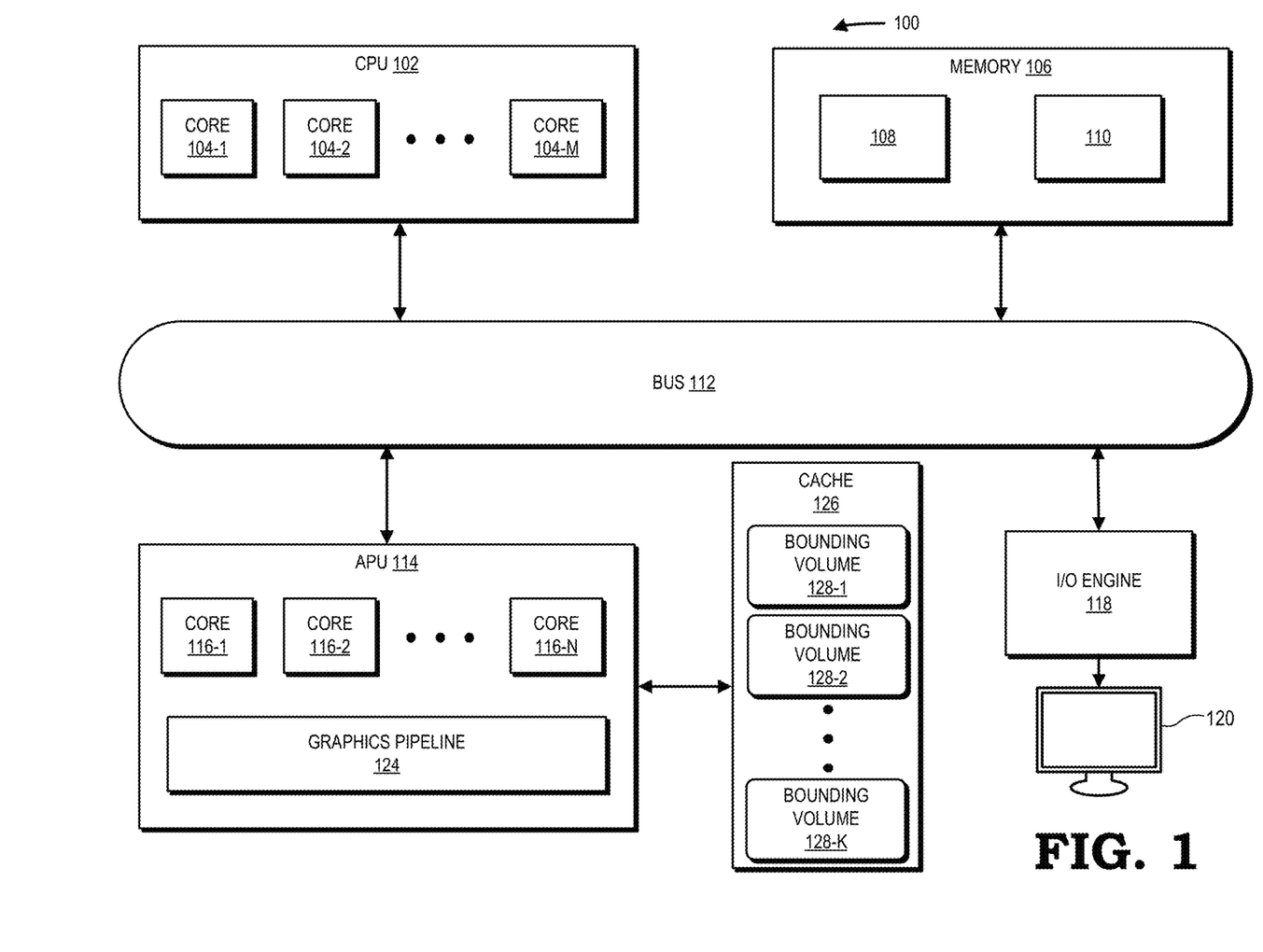
FIG. 1 is a block diagram of a processing system configured to perform one or more spatial tests of one or more bounding volumes using one or more compute units, in accordance with some implementations.

FIG. 1 is a block diagram of a processing system 100 configured to perform one or more spatial tests of one or more bounding volumes according to implementations. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 112 to support communication between entities implemented in the processing system 100, such as the memory 106. Some implementations of the processing system 100 include other buses, bridges, switches, routers, and the like, which are not shown in FIG. 1 in the interest of clarity.

The techniques described herein are, in different implementations, employed at accelerated processing unit (APU) 114. APU 114 includes, for example, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. The APU 114 renders scenes according to one or more applications 110 for presentation on a display 120. For example, the APU 114 renders objects (e.g., textures) to produce values of pixels that are provided to the display 120, which uses the pixel values to display a scene that represents the rendered objects. To render the objects, the APU 114 implements a plurality of processor cores 116-1 to 116-N that execute instructions concurrently or in parallel. For example, the APU 114 executes instructions from a graphics pipeline 124 using a plurality of processor cores 116 to render one or more textures. According to implementations, one or more processor cores 116 operate as SIMD units that perform the same operation on different data sets. Though in the example implementation illustrated in FIG. 1, three cores (116-1, 116-2, 116-N) are presented representing an N number of cores, the number of processor cores 116 implemented in the APU 114 is a matter of design choice. As such, in other implementations, the APU 114 can include any number of cores 116. Some implementations of the APU 114 are used for general-purpose computing. The APU 114 executes instructions such as program code 108 for one or more applications 110 stored in the memory 106 and the APU 114 stores information in the memory 106 such as the results of the executed instructions.

The processing system 100 also includes a central processing unit (CPU) 102 that is connected to the bus 112 and therefore communicates with the APU 114 and the memory 106 via the bus 112. The CPU 102 implements a plurality of processor cores 104-1 to 104-N that execute instructions concurrently or in parallel. In implementations, one or more of the processor cores 104 operate as SIMD units that perform the same operation on different data sets. For example, one or more processor cores 104 operate as SIMD units each having two or more lanes each configured to perform an operation (e.g. spatial test) of a wave. Though in the example implementation illustrated in FIG. 1, three cores (104-1, 104-2, 104-M) are presented representing an M number of cores, the number of processor cores 104 implemented in the CPU 102 is a matter of design choice. As such, in other implementations, the CPU 102 can include any number of cores 104. In some implementations, the CPU 102 and APU 114 have an equal number of cores 104, 116 while in other implementations, the CPU 102 and APU 114 have a different number of cores 104, 116. The processor cores 104 execute instructions such as program code 108 for one or more applications 110 stored in the memory 106 and the CPU 102 stores information in the memory 106 such as the results of the executed instructions. The CPU 102 is also able to initiate graphics processing by issuing draw calls to the APU 114. In implementations, the CPU 102 implements multiple processor cores (not shown in FIG. 1 in the interest of clarity) that execute instructions concurrently or in parallel.

In implementations, the APU 114 is configured to render one or more objects for a scene to be rendered according to a graphics pipeline 124. A graphics pipeline 124 includes, for example, one or more steps, stages, or instructions to be performed by APU 114 in order to render one or more objects for a scene. For example, a graphics pipeline 124 includes data indicating an assembler stage, vertex shader stage, hull shader stage, tessellator stage, domain shader stage, geometry shader stage, binner stage, rasterizer stage, pixel shader stage, output merger stage, or any combination thereof to be performed by APU 114 in order to render one or more objects for a scene. According to implementations, APU 114 is configured to receive input data (e.g., a command stream) indicating, for example, a scene (e.g., primitives of the scene, objects of the scene) and associated scene information. Such scene information includes, for example, data pertaining to how primitives of the scene, objects of the scene, or both are to be rendered based on a viewpoint of that scene. For example, APU 114 is configured to receive a command stream from, for example, an application 110 that indicates one or more draw calls for one or more primitives, objects, or both of the scene and associated scene information that includes, for example, a viewpoint of the scene. In response to receiving the input data (e.g., command stream), APU 114 renders one or more primitives, objects, or both indicated in the input data using graphics pipeline 124 and according to the associated scene information.

To help render one or more primitives, objects, or both for a scene according to associated scene information, APU 114 is configured to generate one or more bounding volumes 128 based on a scene description received, for example, from an application 110. Such a scene description indicates, for example, one or more primitives of a scene, scene geometry, scene layout, a viewpoint of the scene, or any combination thereof. Each bounding volume 128 includes, for example, a partition (e.g., closed volume) of at least a portion of the scene that contains one or more primitives, objects, or both of the scene and includes, for example, an AABB, OBB, bounding shape (e.g., capsule, cylinder, ellipsoid, sphere, slab, triangle), or DOP, to name a few. In implementations, APU 114 is configured to generate one or more acceleration structures that each include one or more bounding volumes. For example, APU 114 is configured to generate one or more acceleration structures that each include a data structure that has two or more nodes (e.g., boxes, leaves) with each node representing a bounding volume 128 of the scene, a primitive of the scene, or both. That is to say, each node of an acceleration structure represents the primitives and objects contained in a bounding volume 128. According to implementations, the nodes of one or more acceleration structures each represents hierarchically arranged bounding volumes 128. Such acceleration structures, include, for example, BHVs, BSP trees, k-dimensional trees, R-trees, or any combination thereof. In implementations, APU 114 generates one or more bounding volumes 128 each representing a respective portion of the scene to be rendered. That is to say, in implementations, APU 114 is configured to divide a scene into two or more portions and generate a respective bounding volume 128 (e.g., generate a respective acceleration structure that includes a bounding volume 128) for each portion of the scene. In response to generating a bounding volume 128, APU 114 stores the bounding volume 128 in a cache 126 included in or otherwise communicatively coupled to APU 114. For example, APU 114 stores one or more acceleration structures each including one or more bounding volumes 128 in cache 126. While the example implementation illustrated in FIG. 1 presents three bounding volumes (128-1, 128-2, 128-K) representing a K number of bounding volumes 128, in other implementations, the processing system 100 may generate any number of bounding volumes 128.

Additionally, to render one or more primitives, objects, or both for a scene according to associated scene information, processing system 100 (e.g., CPU 102, APU 114) is configured to generate one or more sets of planes in the scene to perform one or more spatial tests (e.g, plane tests, frustum tests, or both). Each set of planes in the scene includes, for example, one or more planes at respective locations in the scene. To generate a set of planes in the scene, the processing system 100 is configured to receive a set of plane equations from, for example, an application 110. Such plane equations include, for example, a view reference point (e.g., camera location, eye location) in the scene, one or more normals of one or more planes (e.g., top plane, right plane, left plane, bottom plane, near plane, far plane), a vector position (e.g., vector position of the camera, vector position of the eye), a vector direction (e.g., vector direction of the camera, vector direction of the eye), one or more projection matrices, one or more view matrices, one or more corners, or any combination thereof. As an example, a set of plane equations includes data indicating one or more normals for each of four planes (e.g., top plane, right plane, left plane, bottom plane). Based on the plane equations, processing system 100 defines the set of planes by, for example, determining one or more planes using the plane equations. In implementations, defining a set of planes includes processing system 100 generating data indicating that one or more planes of the defined set of planes are inclusive planes, one or more planes of the defined set of planes are exclusive planes, or both. Such inclusive planes, for example, indicate that one or more intersections of the plane with a bounding volume 128 are to be reported (e.g., output) during a plane test, frustum test, or both. Such exclusive planes, for example, indicate that an intersection with the exclusive plane by one or more bounding volumes reports a failure (e.g., output) during a plane test, frustum test, or both. For example, in response to a bounding volume intersecting with an exclusive plane, data (e.g., a flag) indicating the bounding volume failed the plane test or frustum test is output. According to implementations, processing system 100 is configured to generate one or more frustums of a scene based on one or more plane equations. For example, based on one or more plane equations indicating two or more planes (e.g., inclusive planes, exclusive planes) forming an unbounded shape, processing system 100 defines a frustum of the scene including two or more planes (e.g., inclusive planes, exclusive planes) in the scene forming an unbounded shape and generates the frustum of a scene. Each generated frustum of the scene includes, for example, two or more planes forming an unbounded shape (e.g., unbounded prism, unbounded rectangular pyramid, unbounded triangular pyramid) within a scene (e.g., at a location in the scene).

Using one or more generated bounding volumes 128, APU 114 is configured to perform one or more plane tests, frustum tests, or both (e.g., spatial tests) of one or more bounding volumes 128 using one or more compute units (e.g., cores 116, threads, SIMDs) of processing system 100. For example, APU 114 is configured to perform one or more plane tests of one or more bounding volumes 128 based on one or more sets of planes in the scene using one or more compute units. Such plane tests each include, for example, instructions to determine whether a bounding volume 128 intersects one or more planes of a set of planes in the scene. To perform a plane test of a bounding volume 128, a compute unit (e.g., cores 116, threads, SIMDs) first selects a previously generated set of planes in the scene based on, for example, one or more instructions received from an application 110, one or more instructions in graphics pipeline 124, or both. Using the selected set of planes in the scene, the compute unit then determines whether the bounding volume 128 intersects with one or more planes of the selected set of planes in the scene. For example, the compute unit determines whether the partition of the scene represented by a bounding volume 128 intersects with one or more planes of the selected set of planes in the scene. In response to a bounding volume 128 intersecting with one or more planes of the selected set of planes in the scene, the compute unit generates intersection data indicating whether the bounding volume 128 intersects with one or more planes of the selected set of planes in the scene. For example, the compute unit generates a flag (e.g., intersection data) for one or more planes of the set of planes in the scene indicating whether the bounding volume 128 intersects with a respective plane of the set of planes in the scene. According to implementations, the compute unit generates intersection data indicating a failure in response to an intersection between a bounding volume 128 and an exclusive plane of the set of planes in the scene, indicating intersections between bounding volumes 128 and an inclusive plane of the set of planes in the scene, or both.

As another example, APU 114 is configured to perform one or more frustum tests of one or more bounding volumes 128 based on one or more frustums of the scene using one or more compute units. Such frustum tests each include, for example, instructions to determine whether a bounding volume 128 is at least partially within a frustum of the scene, wholly within a frustum of the scene, partially outside a frustum of the scene, wholly outside a frustum of the scene, or any combination thereof, whether a bounding volume 128 intersects with one or more planes of the frustum of the scene, or both. That is to say, whether the partition of the scene represented by a bounding volume 128 is at least partially within a frustum of the scene, wholly within a frustum of the scene, partially outside a frustum of the scene, wholly outside a frustum of the scene, or any combination thereof, whether the partition of the scene represented by the bounding volume 128 intersects with one or more planes of the frustum of the scene, or both. To perform the frustum test of a bounding volume 128, a compute unit (e.g., cores 116, threads, SIMDs) first selects a previously generated frustum of the scene based on, for example, one or more instructions received from an application 110, one or more instructions in graphics pipeline 124, or both. Using the selected frustum of the scene, the compute unit then determines whether the bounding volume 128 is at least partially within, wholly within, partially output, wholly outside, or any combination thereof, the selected frustum of the scene, whether one or more planes of the selected frustum of the scene intersect the bounding volume 128, or both. In response to a bounding volume 128 being at least partially within, wholly within, partially output, wholly outside, or any combination thereof, the selected frustum of the scene, the compute unit generates intersection data indicating whether the bounding volume 128 is at least partially within, wholly within, partially output, or wholly outside the selected frustum of the scene. For example, the compute unit generates one or more flags (e.g., intersection data) indicating whether the bounding volume 128 is at least partially within, wholly within, partially output, or wholly outside the selected frustum of the scene. Further, in response to a bounding volume 128 intersecting with a plane of the frustum of the scene, the compute unit generates intersection data indicating whether the bounding volume 128 intersects one or more planes of the selected frustum of the scene. For example, the compute unit generates a flag (e.g., intersection data) for one or more planes of the frustum of the scene indicating whether the bounding volume 128 intersects with a respective plane of the frustum of the scene. According to implementations, the compute unit generates intersection data indicating a failure in response to an intersection between a bounding volume 128 and an exclusive plane of the frustum in the scene, indicating intersections between bounding volumes 128 and an inclusive plane of the frustum in the scene, or both.

In implementations, the compute unit stores generated intersection data in a buffer where the intersection data is made available for rendering one or more primitives (e.g., determining which primitives to rasterize, determining which draw calls are visible), performing instructions for a physics engine, performing instructions for a lighting engine, or any combination thereof. For example, the compute unit traverses an acceleration structure by recursively applying plane tests, frustums tests, or both to the leaf bounding volumes 128 of the acceleration structure. In this way, the compute unit determines which leaf bounding volumes 128 of an acceleration structure intersect with one or more planes of a set of planes in the scene, are at least partially within a frustum of the scene, or both and generates intersection data indicating as such. Based on such intersection data, APU 114 is configured to determine which primitives to rasterize based on the primitives included in bounding volumes 128 indicated to intersect with one or more planes of a set of planes in the scene, to be at least partially within a frustum of a scene, or both. That is to say, APU 114 rasterizes the primitives in the bounding volumes 128 indicated to intersect with one or more planes of a set of planes in the scene, be at least partially within a frustum of the scene, or both by the intersection data.

According to implementations, a compute unit is configured to perform multiple spatial tests (e.g., plane tests, frustum tests, or both) of one or more bounding volumes 128 for one or more waves. To this end, a compute unit (e.g., a SIMD unit) includes two or more lanes each configured to perform a spatial test of a bounding volume 128. In implementations, APU 114 assigns one or more bounding volumes 128 to the lanes of a compute unit. For example, APU 114 assigns two or more lanes of a compute unit the same bounding volume 128 (e.g., in the same acceleration structure) stored in cache 126. As another example, APU 114 assigns two or more lanes of a compute unit different bounding volumes 128 (e.g., from different acceleration structures) stored in cache 126. As an additional example, APU 114 assigns bounding volumes 128 from respective acceleration structures to each lane of a compute unit with each acceleration structure representing a respective and distinct portion of the scene to be rendered. Each lane of the compute unit is then configured to perform a plane test or frustum test on its assigned bounding volume 128. To perform a plane test in its assigned bounding volume 128, each lane of a compute unit selects a set of planes in a scene previously generated by processing system 100 based on, for example, one or more instructions received from an application 110, one or more instructions in graphics pipeline 124, or both. According to implementations, two or more lanes of a compute unit select a same set of planes in the scene, two or more lanes of a compute unit select different sets of planes in the scene, or both. As an example, first and second lanes of a compute unit select a same set of planes in the scene. As another example, first and second lanes select different sets of planes in the scene. Using a respective selected set of planes, each lane of a compute unit then determines whether an assigned bounding volume 128 intersects with one or more planes of the respective selected set of planes. In response to an assigned bounding volume 128 intersecting with a plane of a respective selected set of planes, the compute unit generates intersection data indicating the bounding volume 128 intersects with the plane.

To perform a frustum test on its assigned bounding volume 128, each lane of a compute unit selects a frustum of a scene previously generated by processing system 100 based on, for example, one or more instructions received from an application 110, one or more instructions in graphics pipeline 124, or both. In implementations, two or more lanes of a compute unit select a same frustum of the scene, two or more lanes of a compute unit select different frustums of the scene, or both. For example, in implementations, first and second lanes of a compute unit select a same frustum of the scene. As another example, in implementations, first and second lanes of a compute unit select different frustums. Using a respective selected frustum, each lane of a compute unit then determines whether an assigned bounding volume 128 is at least partially within, wholly within, partially output, wholly outside, or any combination thereof, the selected frustum. For example, the lane of the compute unit determines whether the partition of the scene represented by a bounding volume 128 is at least partially within the selected frustum. Additionally, in implementations, each lane of a compute unit determines whether an assigned bounding volume 128 intersects with one or more planes of the frustum. In response to an assigned bounding volume 128 being at least partially within, wholly within, partially output, wholly outside, or any combination, the selected frustum, the lane of the compute unit generates intersection data indicating whether the bounding volume 128 is at least partially within, wholly within, partially output, or wholly outside the selected frustum. In response to an assigned bounding volume 128 intersecting with a plane of the frustum, the lane of the compute unit generates intersection data indicating the bounding volume 128 intersects with the plane. In implementations, the compute unit stores generated intersection data in a buffer where it is made available for rendering one or more primitives (e.g., determining which primitives to rasterize, determining which draw calls are visible), performing instructions for a physics engine, performing instructions for a lighting engine, or any combination thereof.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the APU 114, or the CPU 102. In the illustrated implementation, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the APU 114 or the CPU 102.

Figure 2:
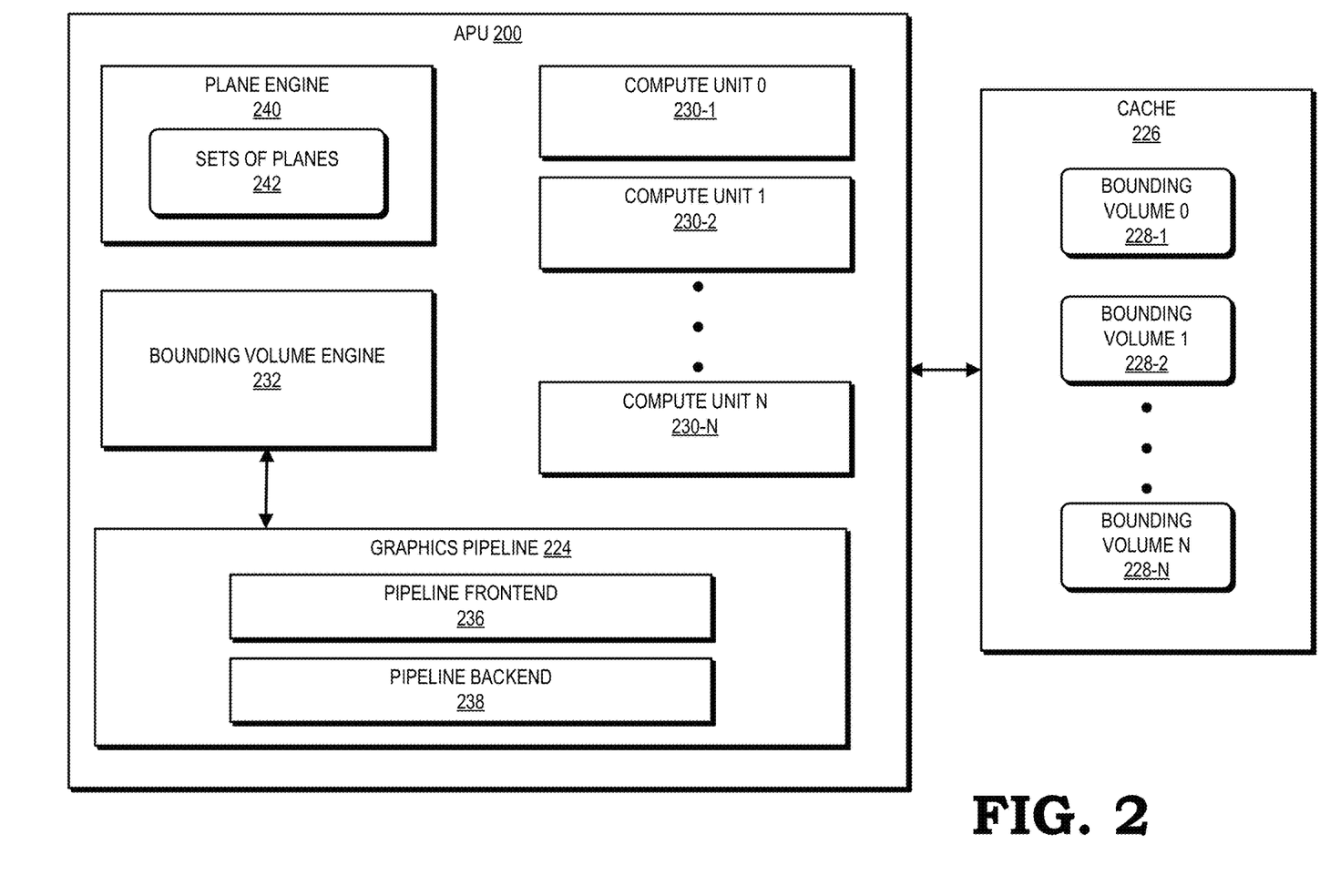
FIG. 2 is a block diagram of an accelerated processing unit configured to perform a spatial test of a bounding volume on a compute unit, in accordance with some implementations.

Referring now to FIG. 2, an APU 200 configured to perform a spatial test (e.g., plane test, frustum test, or both) of a bounding volume using a compute unit is presented. In implementations, APU 200, similar to or the same as APU 114, is configured to render one or more objects of a scene based on a command stream received from an application 110 that indicates, for example, one or more draw calls for one or more primitives of the scene and associated scene information that includes, for example, a viewpoint of the scene. To render the scene indicated in the command stream, APU 200 is configured to render one or more primitives according to graphics pipeline 224, similar to or the same as graphics pipeline 124. Graphics pipeline 224 includes one or more steps, stages, or instructions to be performed by APU 200 in order to render one or more primitive, objects, or both for a scene to be rendered, for example, an assembler stage, a vertex shader stage, a hull shader stage, a tessellator stage, a domain shader stage, a geometry shader stage, a binner stage, a rasterizer stage, a pixel shader stage, an output merger stage, or any combination thereof. In implementations, graphics pipeline 224 includes a pipeline frontend 236 that includes one or more stages of graphics pipeline 224 (e.g., an assembler stage, a vertex shader stage, a hull shader stage, a tessellator stage, a domain shader stage, a geometry shader stage, a binner stage) and a pipeline backend 238 that includes one or more other stages of graphics pipeline 224 (e.g., a rasterizer stage, a pixel shader stage, an output merger stage). According to implementations, in response to receiving a command stream indicating one or more primitives to be rendered for a scene, APU 200 is configured to perform one or more stages of the pipeline frontend 236 (e.g., an assembler stage, a vertex shader stage, a hull shader stage, a tessellator stage, a domain shader stage, a geometry shader stage) to at least partially construct one or more primitives, objects, or both indicated in the command stream.

To help generate such a command stream, APU 200 includes bounding volume engine 232. Bounding volume engine 232 includes hardware-based circuitry, software-based circuitry, or both configured to generate one or more bounding volumes 228, similar to or the same as bounding volumes 128, based on a scene description received from application 110 indicating, for example, one or more primitives of a scene, scene geometry, scene layout, or any combination thereof. A bounding volume 228 includes, for example, a partition (e.g., closed volume) of at least a portion of the scene that contains one or more primitives, objects, or both of the scene and includes, for example, an AABB, OBB, bounding shape (e.g., capsule, cylinder, ellipsoid, sphere, slab, triangle), or DOP, to name a few. In implementations, bounding volume engine 232 is configured to generate one or more acceleration structures that each includes one or more bounding volumes 228. An acceleration structure includes, for example, a data structure that has two or more nodes (e.g., boxes, leaves) with each node representing a respective bounding volume 228, primitive, or both. As an example, acceleration structures include BHVs, BSP trees, k-dimensional trees, R-trees, or any combination thereof. According to implementations, one or more bounding volumes 228 each represent a respective portion of the scene to be rendered. That is to say, in implementations, bounding volume engine 232 is configured to divide a scene into two or more portions and generate a respective bounding volume 228 (e.g., of a respective acceleration structure) for each portion of the scene. In response to generating a bounding volume 228, bounding volume engine 232 stores the bounding volume 228 in a cache 226, similar to or the same as cache 126, included in or otherwise communicatively coupled to APU 114. While the example implementation illustrated in FIG. 2 presents three bounding volumes (228-1, 228-2, 228-N) representing an N number of bounding volumes 228, in other implementations, bounding volume engine 232 may generate any number of bounding volumes 228.

Further, to help produce the command stream, APU 200 is configured to perform one or more spatial tests (e.g., plane tests, frustum tests, or both) on one or more bounding volumes 228 to generate intersection data. To support these spatial tests, APU 200 includes plane engine 240 that includes hardware-based circuitry, software-based circuitry, or both configured to generate one or more sets of planes 242 in a scene. To generate one or more sets of planes 242 in a scene, plane engine 240 receives one or more plane equations from, for example, an application 110. Such plane equations include, for example, a view reference point (e.g., camera location, eye location) in the scene, one or more normals of one or more planes (e.g., top plane, right plane, left plane, bottom plane, near plane, far plane), a vector position (e.g., vector position of the camera, vector position of the eye), a vector direction (e.g., vector direction of the camera, vector direction of the eye), one or more projection matrices, one or more view matrices, one or more corners, or any combination thereof. Based on the plane equations, plane engine 240 defines a set of planes by, for example, determining one or more planes using the plane equations. According to implementations, when defining a set of planes, plane engine 240 is configured to generate data indicating that one or more planes of the defined set of planes are inclusive planes, one or more planes of the defined set of planes are exclusive planes, or both. Such inclusive planes, for example, indicate that one or more intersections of the inclusive plane with a bounding volume 128 are to be reported (e.g., output) during a plane test, frustum test, or both. Such exclusive planes, for example, indicate that, in response to one or more intersections of the exclusive plane with a bounding volume 128, one or more failures are to be reported (e.g., output) during a plane test, frustum test, or both. According to implementations, plane engine 240 is configured to generate one or more frustums of a scene using one or more plane equations. For example, using one or more plane equations indicating at least two planes forming an unbounded shape, plane engine 240 defines a frustum of the scene including at least two planes (e.g. inclusive planes, exclusive planes) in the scene forming an unbounded shape.

To perform one or more spatial tests (e.g., plane tests, frustums tests, or both) APU 200 includes one or more compute units 230 (e.g., cores 116, threads, SIMD units) that each includes hardware-based circuitry, software-based circuitry, or both configured to perform one or more plane tests, frustum tests, or both. Though the example implementation illustrated in FIG. 2 presents APU 200 having three compute units (230-1, 230-2, 230-N) representing an N number of compute units, in other implementations, APU 200 may include any number of compute units 230. To perform a plane test of a bounding volume 228, a compute unit 230 is configured to select a set of planes 242 in a scene based on, for example, one or more instructions received from an application 110, one or more instructions in graphics pipeline 224, or both. Using the selected set of planes 242, the compute unit 230 then determines whether the bounding volume 228 intersects one or more planes of the selected set of planes 242. In response to the bounding volume 228 intersecting with a plane of the selected set of planes, the compute unit 230 generates intersection data (e.g., one or more flags) indicating the bounding volume 228 intersects the plane. To perform one or more frustum tests, a compute unit 230 is configured to select a frustum of a scene previously generated by, for example, plane engine 240, based on, for example, one or more instructions received from an application 110, one or more instructions in graphics pipeline 224, or both. Using the selected frustum of the scene, the compute unit 230 then determines whether the bounding volume 228 is at least partially within, wholly within, partially output, wholly outside, or any combination thereof the selected frustum of the scene, whether the bounding volume 228 intersects one or more planes of the selected frustum of the scene, or both. In response to a bounding volume 228 being at least partially within, wholly within, partially output, wholly outside, or any combination thereof, the selected frustum of the scene, the compute unit 230 generates intersection data indicating whether the bounding volume 228 is at least partially within, wholly within, partially output, or wholly outside the selected frustum of the scene. For example, the compute unit 230 generates intersection data that includes one or more flags indicating whether a bounding volume 228 is at least partially within the frustum of the scene. Further, in implementations, in response to a bounding volume 228 intersecting with a plane of the selected frustum of the scene, the compute unit 230 generates intersection data (e.g., one or more flags) indicating the bounding volume 228 intersects the plane.

In implementations, the compute unit 230 stores the generated intersection data in a buffer where it is made available, for example to a shader, for rendering one or more primitives (e.g., determining which primitives to rasterize, determining which draw calls are visible), performing instructions for a physics engine, performing instructions for a lighting engine, or any combination thereof. For example, the compute unit 230 traverses an acceleration structure by recursively applying plane tests, frustums tests, or both to the leaf bounding volumes 228 of the acceleration structure. In this way, the compute unit 230 determines which leaf bounding volumes 228 of an acceleration structure intersect with one or more planes of a set of planes in the scene, are at least partially within a frustum of the scene, or both and generates intersection data indicating as such. Based on such intersection data, for example, APU 200 determines which primitives to rasterize based on the primitives included in bounding volumes 228 indicated to intersect with one or more planes of a set of planes 242 in the scene, to be at least partially within a frustum of a scene, or both.

According to implementations, one or more compute units 230 are configured to perform multiple spatial tests (e.g., plane tests, frustum tests, or both) of one or more bounding volumes 228 for one or more waves. For example, one or more compute units 230 are each configured to perform multiple plane tests, frustum tests, or both of one or more bounding volumes 228 for a wave. To this end, one or more compute units 230 (e.g., SIMD units) each includes two or more lanes each configured to perform a spatial test (e.g. plane test, frustum test) of a bounding volume 228. In implementations, APU 200 assigns one or more bounding volumes 228 to the lanes of a compute unit 230. For example, APU 200 assigns two or more lanes of a compute unit the same bounding volume 228 stored in cache 226. As another example, APU 200 assigns two or more lanes of a compute unit 230 different bounding volumes stored in cache 226. Each lane of the compute unit 230 is then configured to perform a plane test or frustum test on its assigned bounding volume 228. To perform a plane test in its assigned bounding volume 228, a lane of a compute unit 230 selects a set of planes 242 in a scene previously generated by, for example, plane engine 240 based on, for example, one or more instructions received from an application 110, one or more instructions in graphics pipeline 224, or both. According to implementations, two or more lanes of a compute unit 230 select a same set of planes 242 in the scene, two or more lanes of a compute unit 230 select different sets of planes 242 in the scene, or both. Using a respective selected set of planes 242 in the scene, a lane of a compute unit 230 then determines whether an assigned bounding volume 228 intersects with one or more planes of the respective selected set of planes 242 in the scene. In response to an assigned bounding volume 228 intersecting with a plane of a respective selected set of planes 242 in the scene, the lane of the compute unit 230 generates intersection data indicating the bounding volume 228 intersects with the plane. In implementations, the compute unit 230 then stores the generated intersection data in a buffer where it is made available for rendering one or more primitives (e.g., determining which primitives to rasterize, determining which draw calls are visible), performing instructions for a physics engine, performing instructions for a lighting engine, or any combination thereof.

To perform a frustum test on its assigned bounding volume 228, a lane of a compute unit 230 selects a frustum of a scene previously generated by, for example, plane engine 240 based on, for example, one or more instructions received from an application 110, one or more instructions in graphics pipeline 224, or both. In implementations, two or more lanes of a compute unit 230 select a same frustum of the scene, two or more lanes of a compute unit 230 select different frustums of the scene, or both. Using a respective selected frustum of the scene, a lane of a compute unit 230 then determines whether an assigned bounding volume 228 is at least partially within, wholly within, partially output, wholly outside, or any combination thereof, the selected frustum. Additionally, in implementations, a lane of a compute unit 230 determines whether an assigned bounding volume 228 intersects with one or more planes of the selected frustum of the scene. In response to an assigned bounding volume 228 being at least partially within, wholly within, partially output, wholly outside, or any combination, the selected frustum of the scene, the lane of the compute unit generates intersection data indicating whether the bounding volume 228 is at least partially within, wholly within, partially output, or wholly outside the selected frustum of the scene. In response to an assigned bounding volume 228 intersecting with a plane of the selected frustum of the scene, the lane of the compute unit 230 generates intersection data indicating the bounding volume 228 intersects with the plane. In implementations, the compute unit 230 then stores the generated intersection data in a buffer where it is made available for rendering one or more primitives (e.g., determining which primitives to rasterize, determining which draw calls are visible), performing instructions for a physics engine, performing instructions for a lighting engine, or any combination thereof.

Figure 3:
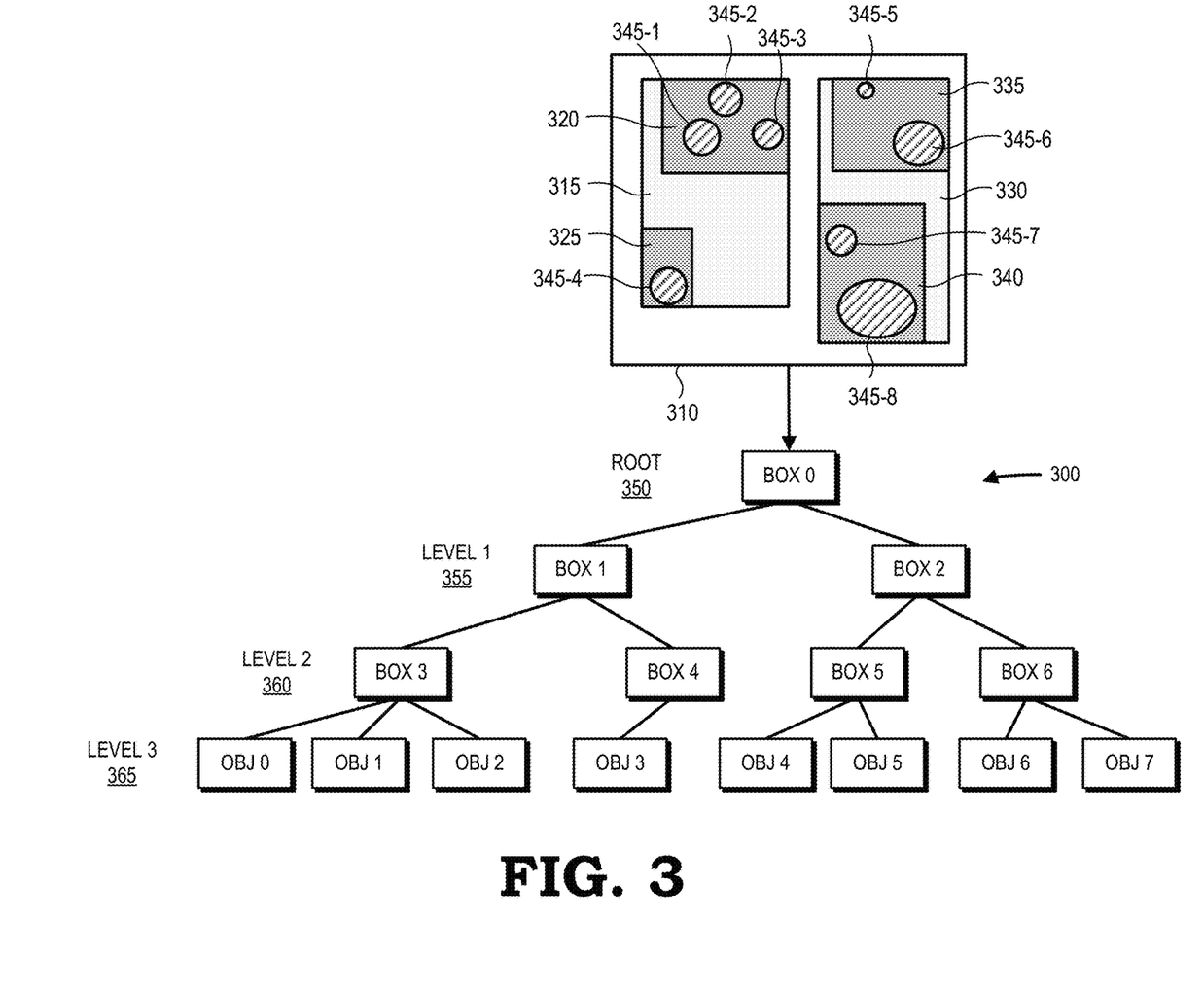
FIG. 3 is a diagram of an example acceleration structure including one or more bounding volumes used for performing a spatial test, in accordance with some implementations.

Referring now to FIG. 3, a diagram of an example acceleration structure 300 including one or more bounding volumes for performing one or more plane tests, frustum tests, or both is presented. In an example implementation, to help render a scene indicated in a scene description, an APU, similar to or the same as APU 114, 200, is configured to generate an acceleration structure 300 that represents at least a portion 310 of the scene to be rendered. To generate the acceleration structure 300, the APU first determines the primitives in the portion 310 of the scene. Referring to the example implementation presented in FIG. 3, the APU first determines that the portion 310 of the scene includes groups of primitives (e.g., graphics objects) 345-1, 345-2, 345-3, 345-4, 345-5, 345-6, 345-7, 345-8. Though the example implementation presented in FIG. 3 presents a portion 310 of the scene including eight graphics objects 345, in other implementations, a portion 310 of the scene may have any number of primitives, graphics objects, or both. Next, the APU generates a predetermined number of bounding volumes, similar to or the same bounding volume 128, 228, that each contain one or more graphics objects 345 of the portion 310 of the scene. For example, in the example implementation presented in FIG. 3, the APU generates a first bounding volume (e.g., BOX 3) 320 containing graphics objects 345-1, 345-2, and 345-3, a second bounding volume (e.g., BOX 4) 325 containing graphics object 345-4, a third bounding volume (e.g., BOX 5) 335 containing graphics objects 345-5, 345-6, and a fourth bounding volume (e.g., BOX 6) 340 containing graphics objects 345-7, 345-8. After generating these bounding volumes, the APU then generates a second set of bounding volumes such that each bounding volume of the second set of bounding volumes contains one or more of the previously generated bounding volumes. That is to say, the APU generates a set of one or more bounding volumes that each contains one or more of the previously generated bounding volumes. For example, in the example implementation presented in FIG. 3, the APU generates a fifth bounding volume (e.g., BOX 1) that contains the first bounding volume (e.g., BOX 3) 320 and the second bounding volume (e.g., BOX 4) 325 and a sixth bounding volume (e.g., BOX 2) that contains the third bounding volume (e.g., BOX 4) 335 and the fourth bounding volume (e.g., BOX 5) 340. In implementations, the APU is then configured to generate a bounding volume that encompasses all of the previously generated bounding volumes. For example, in the example implementation presented in FIG. 3, the APU generates a seventh bounding volume (e.g., BOX 0) 370 encompassing all the previously generated bounding volumes.

After generating the bounding volumes, the APU is configured to generate an acceleration structure 300 based on the bounding volumes. For example, the APU is configured to generate a hierarchical structure having nodes each representing a bounding volume and arranged such the node of the largest bounding volume is at the highest level of the structure and nodes of subsequently smaller bounding volumes are at increasingly lower levels of the structure. For example, in the example implementation presented in FIG. 3, the seventh bounding volume (e.g., BOX 0) encompassing all the other bounding volumes (e.g., the largest bounding volume) is represented as a node at a root (e.g., top) level 350 of the acceleration structure 300. Further, the fifth bounding volume (e.g., BOX 1) 315 encompassing the first bounding volume (e.g., BOX 3) 320 and the second bounding volume (e.g., BOX 4) 325 and the sixth bounding volume (e.g., BOX 2) 330 encompassing the third bounding volume (e.g., BOX 5) 335 and the fourth bounding volume (e.g., BOX 6) 340 are represented as nodes at a second level (e.g., level 1) 355 of the acceleration structure. Additionally, the first bounding volume (e.g., BOX 3) 320, the second bounding volume (e.g., BOX 4) 325, the third bounding volume (e.g., BOX 5) 335, and the fourth bounding volume (e.g., BOX 6) 340 are represented as nodes at a third level (e.g., level 2) of the acceleration structure 300. Additionally, the nodes representing the first bounding volume (e.g., BOX 3) 320, the second bounding volume (e.g., BOX 4) 325, the third bounding volume (e.g., BOX 5) 335, and the fourth bounding volume (e.g., BOX 6) 340 are each connected to the node in the first layer 355 representing the larger bounding volume that encompasses the bounding volume of the node. The last level (e.g., level 3) 365 of the acceleration structure 300 includes nodes each representing the graphics objects 345 in the portion 310-5 of the scene 305. Each node representing a graphics object 345 is connected to the node in the second layer 360 representing the bounding volume that encompasses the graphics object 345 of the node. For example, the nodes representing graphics objects 345-1, 345-2, 345-3 (e.g., object 0, object 1, object 2) are each connected to the node representing the first bounding volume (e.g., BOX 3) 320 that encompasses the graphics objects 345-1, 345-2, 345-3.

Figure 4:
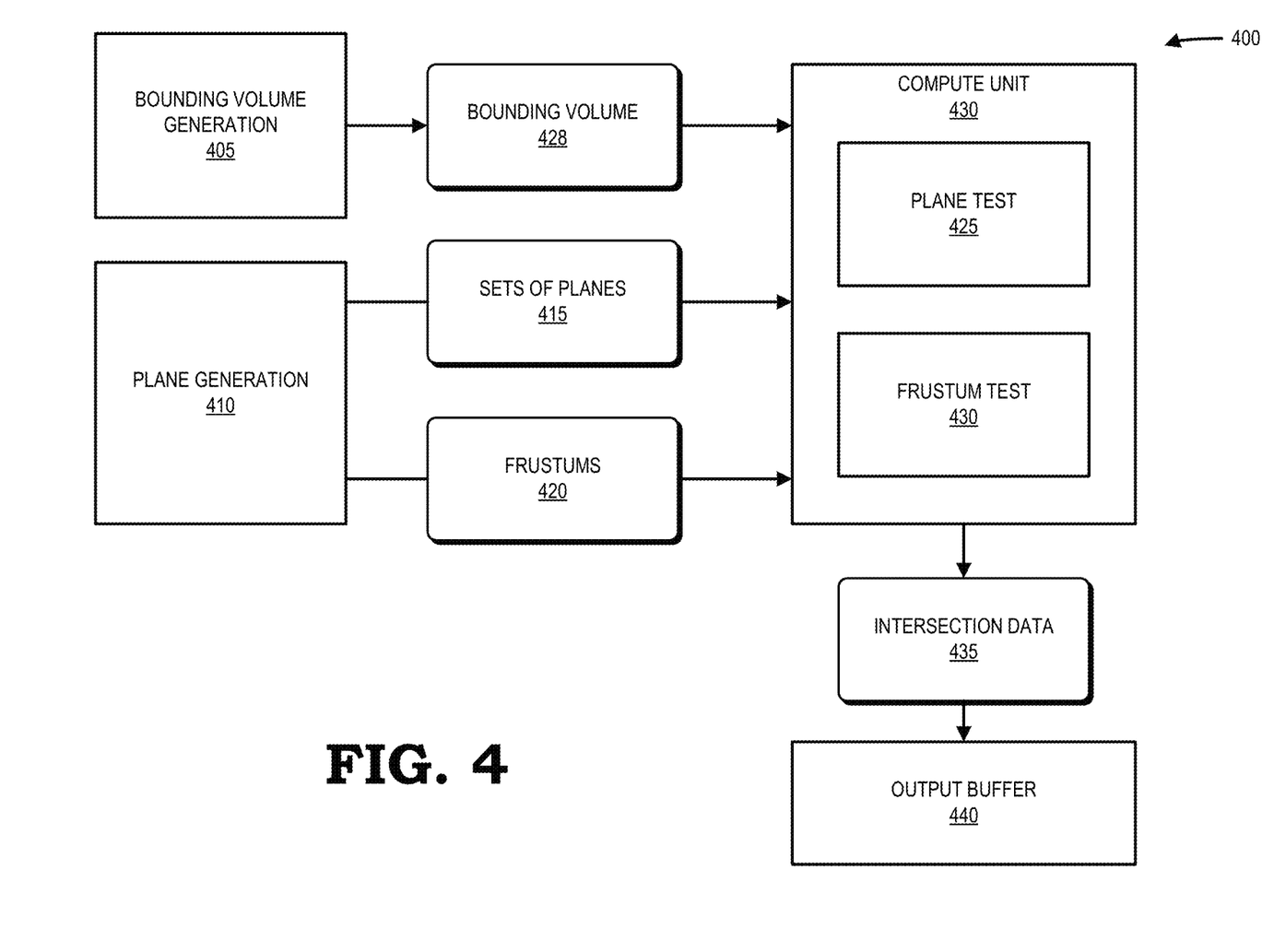
FIG. 4 is a flow diagram of an example operation for performing a spatial test of a bounding volume on a compute unit, in accordance with some implementations.

Referring now to FIG. 4, an example operation 400 for performing a spatial test (e.g. plane test, frustum test, or both) of a bounding volume on a compute unit is presented. In implementations, operation 400 includes an APU, similar or the same as APU 114, 200, performing a bounding volume generation operation 405. The bounding volume generation operation 405 first includes the APU receiving a scene description that includes, for example, one or more primitives of a scene, scene geometry, scene layout, or any combination. In response to receiving the scene description, the APU is configured to generate bounding volume 428, similar to or the same as bounding volumes 128, 228, based on the scene description. Bounding volume 428 includes, for example, a data structure (e.g., AABB, OBB, bounding shape (e.g., capsule, cylinder, ellipsoid, sphere, slab, triangle), or DOP) representing a partition (e.g., closed volume) of at least a portion of the scene that contains one or more primitives, objects, or both of the scene. In implementations, the APU is configured to generate an acceleration structure (e.g., BHV, BSP tree, k-dimensional tree, R-tree) that includes bounding volume 428.

Additionally, example operation 400 includes a processing system, similar to or the same as processing system 100, performing a plane generation operation 410 that includes the processing system generating one or more sets of planes 415 (e.g., sets of planes 242) in the scene, one or more frustums 420 of the scene, or both. To generate one or more sets of planes 415 in the scene, the processing system first receives a set of plane equations from, for example, an application 110. Such plane equations include, for example, a view reference point (e.g., camera location, eye location) in the scene, one or more normals of one or more planes (e.g., top plane, right plane, left plane, bottom plane, near plane, far plane), a vector position (e.g., vector position of the camera, vector position of the eye), a vector direction (e.g., vector direction of the camera, vector direction of the eye), one or more projection matrices, one or more view matrices, or any combination thereof. As an example, a set of plane equations includes data indicating one or more normals for each of four planes (e.g., top plane, right plane, left plane, bottom plane). Based on the plane equations, the processing system defines a set of planes 415 including one or more planes in the scene. In implementations, plane generation operation 410 further includes generating one or more frustums 420 of a scene based on one or more plane equations. For example, using one or more plane equations indicating two or more planes defining an unbounded shape, the processing system defines a frustum 420 of a scene that includes two planes in the scene that form an unbounded shape. In implementations, a frustum 420 of the scene includes two or more planes forming an unbounded shape (e.g., unbounded prism, unbounded rectangular pyramid, unbounded triangular pyramid) within a scene (e.g., at a location in the scene) be rendered.

The example operation 400 further includes compute unit 430 (e.g., core 116, thread, SIMD unit), similar to or the same as compute units 230, performing a plane test operation 425, frustum test operation 445, or both on bounding volume 428. To perform a plane test operation 425 on bounding volume 428, compute unit 430 is configured to select a set of planes 415 in a scene based on, for example, one or more instructions received from an application 110, one or more instructions in a graphics pipeline, or both. Using the selected set of planes 415, compute unit 430 then determines whether bounding volume 428 intersects with one or more planes of the selected set of planes 415. For example, compute unit 430 determines whether the partition of the scene represented by bounding volume 428 intersects with one or more planes of the selected set of planes 415 in the scene. In response to bounding volume 428 intersecting one or more planes of the selected set of planes 415 in the scene, compute unit 430 generates intersection data 435 indicating whether bounding volume 428 intersects with one or more planes of the selected set of planes 415 in the scene.

For example, compute unit 430 generates intersection data 435 that includes one or more flags indicating whether bounding volume 428 intersects with respective planes of the selected set of planes 415 in the scene.

To perform a frustum test operation 445 on bounding volume 428, compute unit 430 is configured to select a frustum 420 of the scene based on, for example, one or more instructions received from an application 110, one or more instructions in a graphics pipeline, or both. Using the selected frustum 420, compute unit 430 then determines whether bounding volume 428 is at least partially within, wholly within, partially output, wholly outside, or any combination thereof, the selected frustum 420, whether bounding volume 428 intersects one or more planes of the selected frustum 420, or both. For example, compute unit 430 determines whether the partition of the scene represented by bounding volume 428 is at least partially within the selected frustum 420. In response to bounding volume 428 being at least partially within, wholly within, partially output, wholly outside, or any combination, the selected frustum 420, compute unit 430 generates intersection data 435 indicating whether bounding volume 428 is at least partially within, wholly within, partially output, or wholly outside the selected frustum 420. For example, compute unit 430 generates intersection data 435 that includes one or more flags indicating whether bounding volume 428 is at least partially within the selected frustum 420. Additionally, in implementations, in response to bounding volume 428 intersecting with a plane of the selected frustum 420, compute unit 430 generates intersection data 435 indicating that bounding volume 428 intersects with one or more planes of the selected frustum 420. For example, compute unit 430 generates a flag indicating that bounding volume 428 intersects with a respective plane of the selected frustum 420.

Compute unit 430 then stores intersection data 435 in output buffer 440 where it is made available for rendering one or more primitives (e.g., determining which primitives to rasterize, determining which draw calls are visible), performing instructions for a physics engine, performing instructions for a lighting engine, or any combination thereof.

Figure 5:
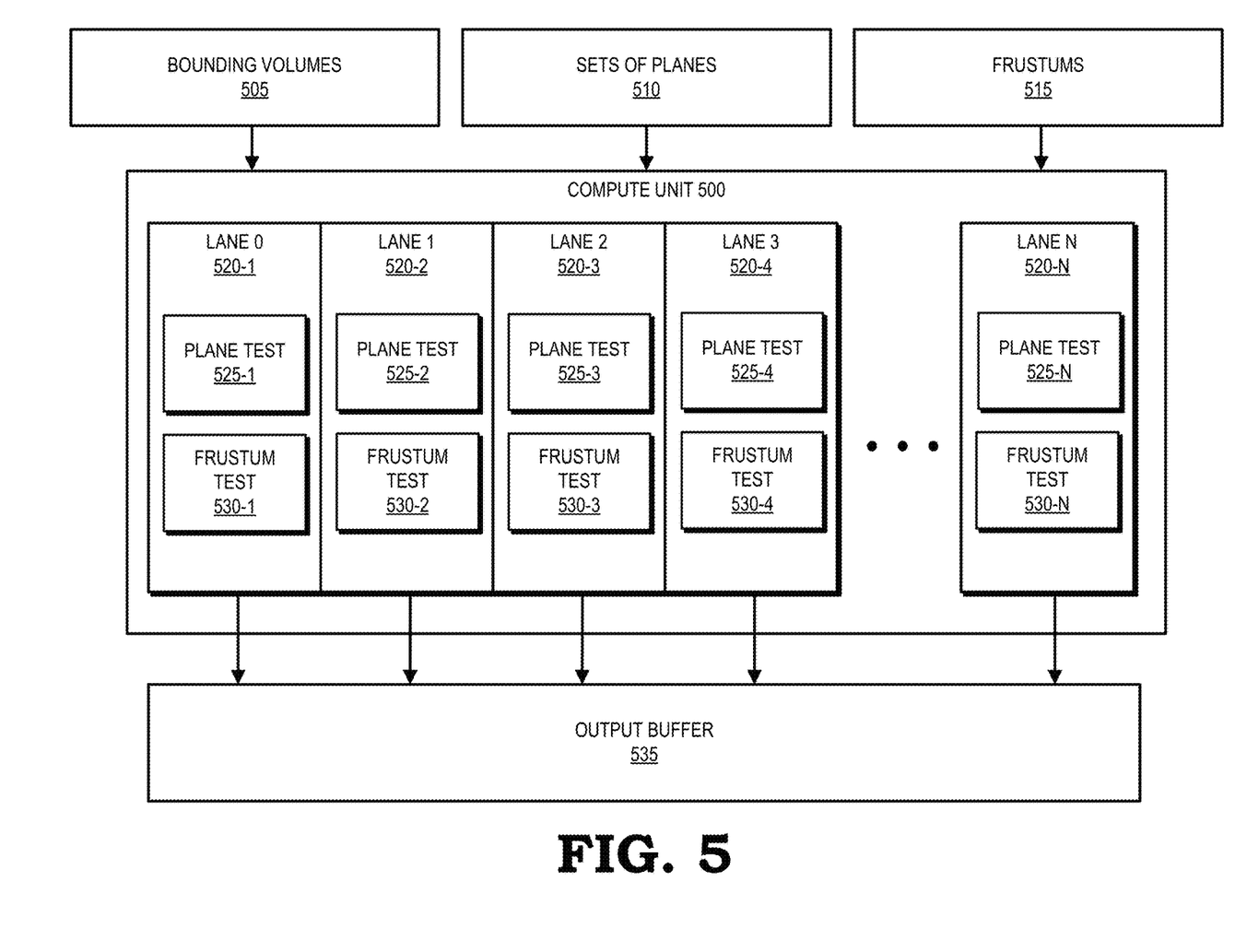
FIG. 5 is a block diagram of compute unit configured to perform multiple spatial tests of one or more bounding volumes, in accordance with some implementations.

Referring now to FIG. 5, a compute unit 500 configured to perform multiple spatial tests (e.g., plane tests, frustum tests, or both) of one or more bounding volumes is presented. Compute unit 500, similar to or the same as compute units 230, 430, includes two or more lanes (e.g., execution units, slots) 520 each configured to perform a respective plane test 525, frustum test 530, or both. For example, compute unit 500 includes a SIMD including two or lanes 520 each configured to perform a respective plane test 525 or frustum test 530 of a bounding volume as part of a single wave. Though the example implementation illustrated in FIG. 5 presents compute unit 500 including five lanes (520-1, 520-2, 520-3, 520-4, 520-N) representing an N number of lanes 520, in other implementations, compute unit 500 may have any number of lanes. In implementations, processing system 100 assigns one or more generated bounding volumes 505, similar to or the same as bounding volumes 128, 228, 428, to each lane 520 of compute unit 500 based on, for example, instructions received from an application 110. As an example, processing system 100 receives instructions (e.g., a wave) from an application 110 indicating that one or more plane tests 525, frustum tests 530, or both are to be performed for one or more bounding volumes 505. To fulfill these plane tests 525 and frustum tests 530, processing system 100 assigns a bounding volume 505 to each lane 520 such that each lane performs a plane test 525 or frustum test 530 on the assigned bounding volume 505. According to implementations, processing system 100 assigns two or more lanes 520 the same bounding volume 505, two or more lanes 520 different bounding volumes 505, or both. For example, processing system 100 assigns each lane 520 the same bounding volume 505. As another example, processing system 100 assigns each lane 520 a different bounding volume 505.

To perform a plane test 525 on an assigned bounding volume 505, a lane 520 is configured to first select a set of planes 510 in a scene, similar to or the same as sets of planes 242, 415, generated by, for example, processing system 100. In implementations, a lane 520 selects a set of planes 510 based on instructions received from an application 110, one or more stages of a graphics pipeline (e.g., graphics pipeline 124, 224), or both. According to implementations, two or more lanes 520 performing a plane test 525 select the same set of planes 510 in a scene, select different sets of planes 510 in the scene, or both. For example, each lane 520 performing a plane test 525 for a wave selects the same set of planes 510 in a scene. As another example, each lane 520 performing a plane test 525 for a wave selects different sets of planes 510 in a scene. After selecting a set of planes 510 in the scene, each lane 520 then determines if one or more planes of the selected set of planes 510 in a scene intersect with an assigned (e.g., respective) bounding volume 505. For example, a lane 520 determines if the partition of the scene represented by an assigned bounding volume 505 intersects with one or more planes of a selected set of planes 510 in the scene. In response to an assigned bounding volume 505 intersecting a plane of the selected set of planes 510 in the scene, the lane 520 generates intersection data (e.g., one or more flags), similar to or the same as intersection data 435, indicating that the bounding volume 505 intersects with the plane of the set of planes 510 and stores the intersection data in an output buffer 535, similar to or the same as output buffer 440, where it is made available to help render one or more primitives, perform one or more physics operations for a physics engine, perform one or more lighting operations for a lighting engine, or any combination thereof.

To perform a frustum test 530 of an assigned bounding volume 505, a lane 520 is configured to first select a frustum 515 of a scene, similar to or the same as frustums 420, generated by, for example, processing system 100. In implementations, a lane 520 selects a frustum 515 of a scene based on instructions received from an application 110, one or more stages of a graphics pipeline (e.g., graphics pipeline 124, 224), or both. According to implementations, two or more lanes 520 performing a frustum test 530 select the same frustum 515 of a scene, select different frustums 515 of the scene, or both. For example, each lane 520 performing a frustum test 530 for a wave selects the same frustum 515 of a scene. As another example, each lane 520 performing a frustum test 530 for a wave selects different frustums 515 of a scene. After selecting a frustum 515 of the scene, each lane 520 then determines whether an assigned bounding volume 505 is at least partially within, wholly within, partially output, wholly outside, or any combination thereof, the selected frustum 515, whether an assigned bounding volume 505 intersects with a plane of the selected frustum 515, or both. For example, a lane 520 determines whether the partition of the scene represented by an assigned bounding volume 505 is at least partially within the selected frustum 515. In response to an assigned bounding volume 505 being at least partially within, wholly within, partially output, wholly outside, or any combination thereof, the selected frustum 515, the lane 520 generates intersection data (e.g., one or more flags) indicating whether the bounding volume 505 is at least partially within, wholly within, partially output, or wholly outside the selected frustum 515 and stores the intersection data in an output buffer 535. Additionally, in response to an assigned bounding volume 505 intersecting a plane of the selected frustum 515, the lane 520 generates intersection data (e.g., one or more flags) indicating that the bounding volume 505 intersects with the plane and stores the intersection data in the output buffer 535. The processing system 100 then makes the intersection data stored in the output buffer 535 available to help render one or more primitives, perform one or more physics operations for a physics engine, perform one or more lighting operations for a lighting engine, or any combination thereof.

Figure 6:
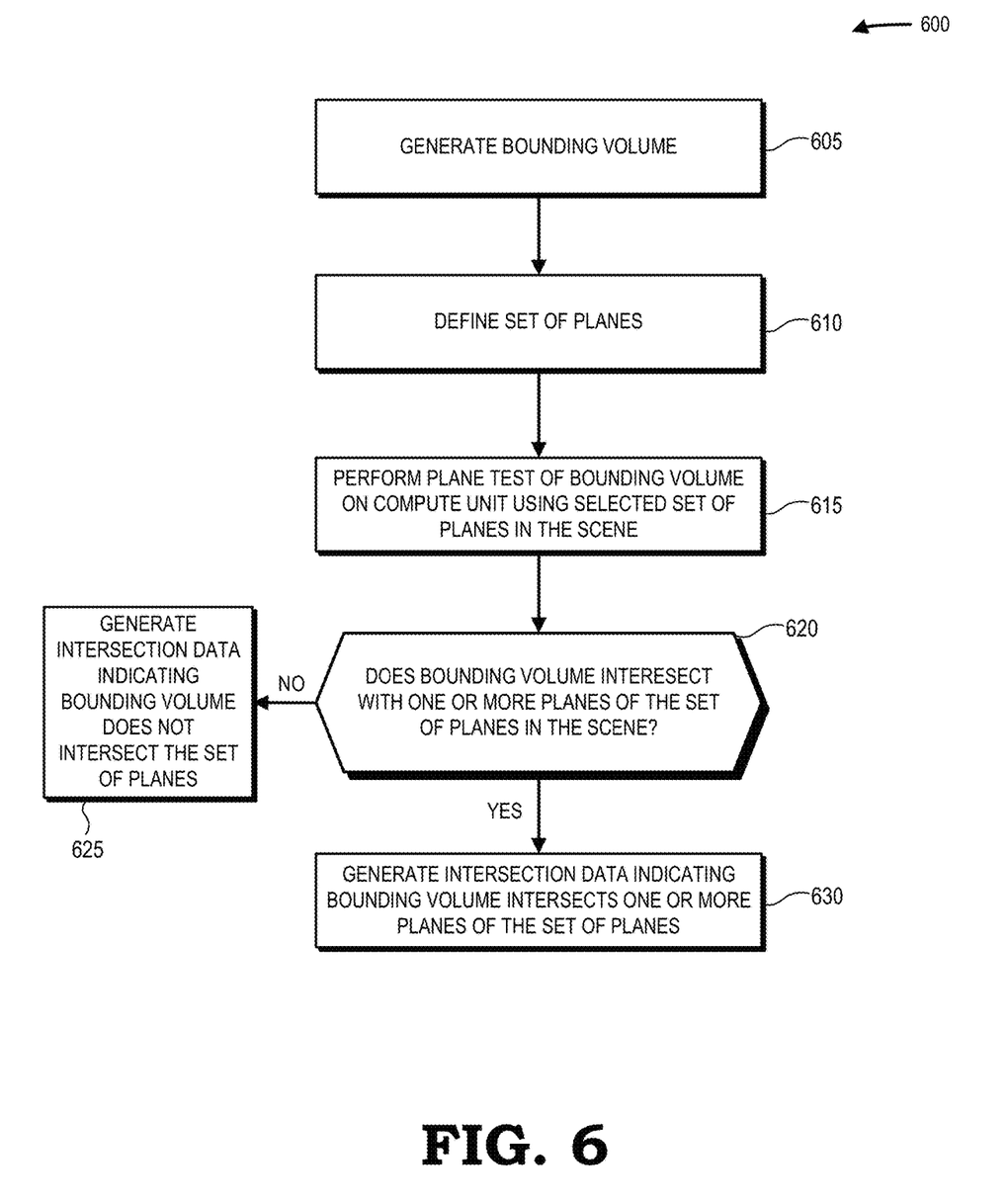
FIG. 6 is a flow diagram of an example method for performing a plane test of a bounding volume on a compute unit, in accordance with some implementations.

Referring now to FIG. 6, an example method 600 for performing a plane test of a bounding volume using a compute unit is presented. At step 605, in response to receiving a scene description indicating, for example, one or more primitives of a scene, scene geometry, scene layout, or any combination thereof, an APU, similar to or the same as APU 114, 200, generates one or more bounding volumes, similar to or the same as bounding volumes 128, 228, 428, 505, based on the scene description. Each bounding volume, for example, includes a data structure (e.g., AABB, OBB, bounding shape (e.g., capsule, cylinder, ellipsoid, sphere, slab, triangle), DOP) that represents a partition (e.g., closed volume) of at least a portion of the scene that contains one or more primitives, objects, or both of the scene. In implementations, the APU generates one or more acceleration structures that each include one or more bounding volumes. For example, the APU generates one or more acceleration structures that each include a data structure (e.g., BHVs, BSP trees, k-dimensional trees, R-trees) that has two or more nodes (e.g., boxes, leaves) with each node representing a bounding volume.

At step 610, a processing system, similar to or the same as processing system 100, defines a set of planes. To this end, the processing system first receives a set of plane equations from, for example, an application 110. Such plane equations include, for example, a view reference point (e.g., camera location, eye location) in the scene, one or more normals of one or more planes (e.g., top plane, right plane, left plane, bottom plane, near plane, far plane), a vector position (e.g., vector position of the camera, vector position of the eye), a vector direction (e.g., vector direction of the camera, vector direction of the eye), one or more projection matrices, one or more view matrices, or any combination thereof. As an example, a set of plane equations includes data indicating one or more normals for each of four planes (e.g., top plane, right plane, left plane, bottom plane). Based on the plane equations, the processing system defines a set of planes in a scene.

At step 615, a compute unit (e.g., core 116, thread, SIMD unit), similar to or the same as compute units 230, 430, 500 performs a plane test on one or more bounding volumes. For example, a compute unit performs a plane test on a bounding volume assigned to the compute unit by processing system 100, the APU, or both. To perform a plane test on the bounding volume, the compute unit selects a previously defined set of planes in the scene based on, for example, one or more instructions received from an application 110, one or more instructions in a graphics pipeline, or both. At step 620, to perform the plane test, the compute unit determines whether the bounding volume intersects with one or more planes of the selected set of planes in the scene. In response to the bounding volume intersecting one or more planes of the selected set of planes in the scene, the system moves on to step 630. At step 630, the compute unit generates intersection data indicating that the bounding volume intersects with one or more planes of the selected set of planes in the scene. As an example, the compute unit generates one or more respective flags each indicating that the bounding volume intersects a respective plane of the selected set of planes in the scene. The compute unit then stores the generated intersection data in an output buffer, similar to or the same as output buffer 440, 535 where it is made available to help render one or more primitives, perform one or more physics operations for a physics engine, perform one or more lighting operations for a lighting engine, or any combination thereof.

Referring again to step 620, in response to the bounding volume not intersecting with one or more planes of the selected set of planes in the scene, the system moves on to step 625. At step 625, the compute unit generates intersection data indicating that the bounding volume does not intersect with any planes of the selected set of planes and stores. For example, the compute unit generates a flag indicating that the bounding volume does not intersect with any planes of the selected set of planes in the scene. The compute unit then stores such intersection data in the output buffer where it is similarly made available to help render one or more primitives, perform one or more physics operations for a physics engine, perform one or more lighting operations for a lighting engine, or any combination thereof.

Figure 7:
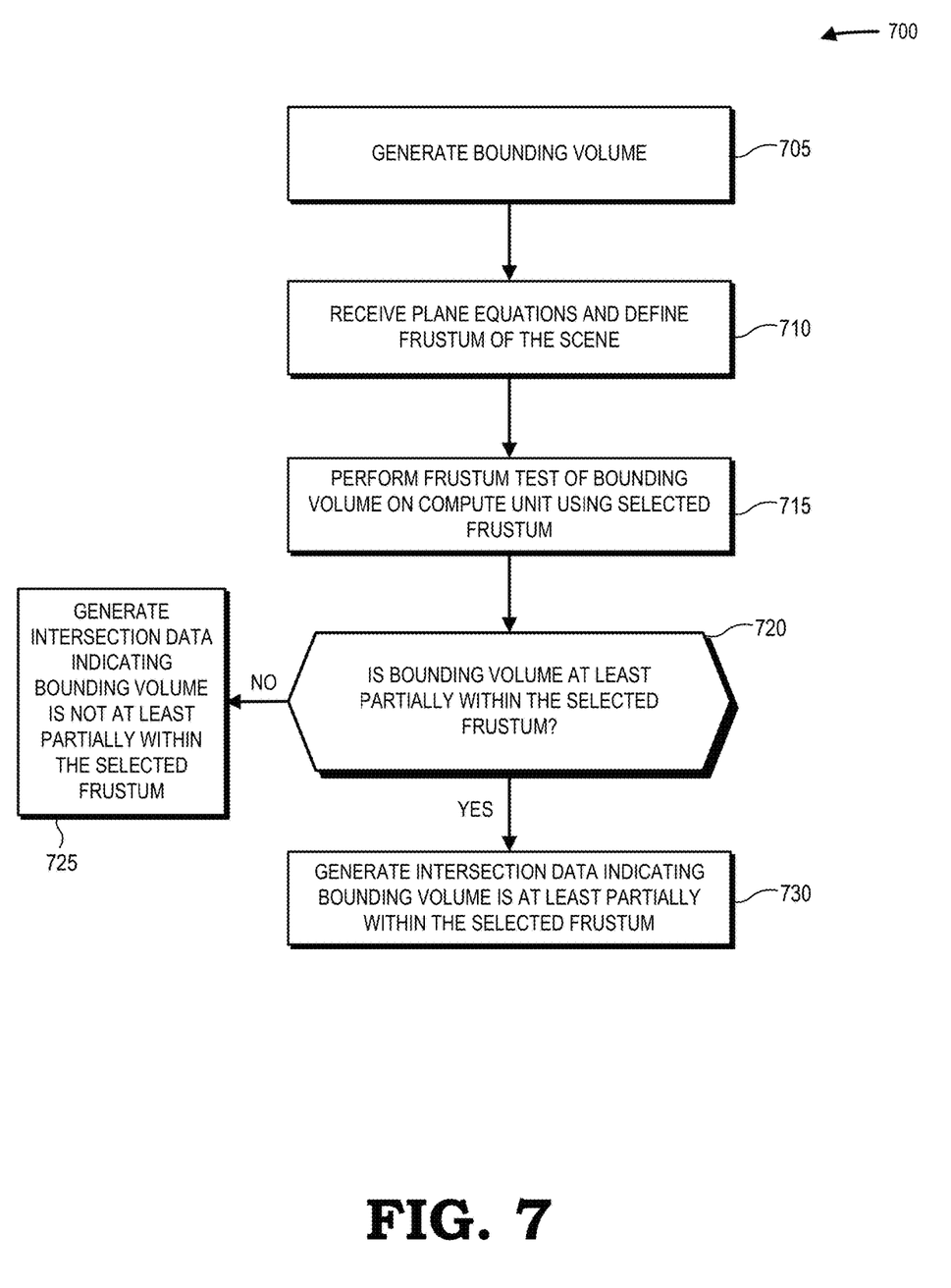
FIG. 7 is a flow diagram of an example method for performing a frustum test of a bounding volume on a compute unit, in accordance with some implementations.

Referring now to FIG. 7, an example method 700 for performing a frustum test of a bounding volume using a compute unit is presented. At step 705, in response to receiving a scene description indicating, for example, one or more primitives of a scene, scene geometry, scene layout, or any combination thereof, an APU, similar to or the same as APU 114, 200, generates one or more bounding volumes, similar to or the same as bounding volumes 128, 228, 428, 505, based on the scene description. Each bounding volume, for example, includes a data structure (e.g., AABB, OBB, bounding shape (e.g., capsule, cylinder, ellipsoid, sphere, slab, triangle), DOP) that represents a partition (e.g., closed volume) of at least a portion of the scene that contains one or more primitives, objects, or both of the scene. In implementations, the APU generates one or more acceleration structures that each include one or more bounding volumes. For example, the APU generates one or more acceleration structures that each include a data structure (e.g., BHVs, BSP trees, k-dimensional trees, R-trees) that has two or more nodes (e.g., boxes, leaves) with each node representing a bounding volume.

At step 710, a processing system, similar to or the same as processing system 100, receives a set of plane equations from, for example, an application 110. Such plane equations include, for example, a view reference point (e.g., camera location, eye location) in the scene, one or more normals of one or more planes (e.g., top plane, right plane, left plane, bottom plane, near plane, far plane), a vector position (e.g., vector position of the camera, vector position of the eye), a vector direction (e.g., vector direction of the camera, vector direction of the eye), one or more projection matrices, one or more view matrices, one or more corners, or any combination thereof. As an example, a set of plane equations includes data indicating one or more normals for each of four planes (e.g., top plane, right plane, left plane, bottom plane). Based on the plane equations, the processing system defines a frustum of the scene by determining a frustum using the plane equations. Each frustum in the scene includes, for example, a list of one or more planes within a scene, an unbounded shape (e.g., unbounded prism, unbounded rectangular pyramid, unbounded triangular pyramid) within a scene (e.g., at a location in the scene), or both.

At step 715, a compute unit (e.g., core 116, thread, SIMD unit), similar to or the same as compute units 230, 430, 500 performs a frustum test on one or more bounding volumes. For example, a compute unit performs a frustum test on a bounding volume assigned to the compute unit by processing system 100, the APU, or both. To perform a frustum test on the bounding volume, the compute unit selects a previously defined frustum of the scene based on, for example, one or more instructions received from an application 110, one or more instructions in a graphics pipeline, or both. At step 720, to perform the frustum test, the compute unit, for example, determines whether the bounding volume is at least partially within the selected frustum of the scene. In response to the bounding volume being at least partially within the frustum, the system moves on to step 730. At step 730, the compute unit generates intersection data indicating that the bounding volume is at least partially within the frustum. For example, the compute unit generates a flag indicating that the bounding volume is at least partially within the frustum. In implementations, the compute unit is configured to store the generated intersection data in an output buffer, similar to or the same as output buffer 440, 535 where it is made available to help render one or more primitives, perform one or more physics operations for a physics engine, perform one or more lighting operations for a lighting engine, or any combination thereof. Referring again to step 720, in response to the bounding volume not being at least partially within the frustum, the system moves on to step 725. At step 725, the compute unit generates intersection data indicating that the bounding volume is not at least partially within the frustum and stores the intersection data in the output buffer. For example, the compute unit generates a flag indicating that the bounding volume is not at least partially within the frustum and stores the flag in the output buffer.

In some implementations, the apparatus and techniques described above are implemented in a system including one or more integrated circuit (IC) devices (also referred to as integrated circuit packages or microchips), such as the operations for performing frustum queries of one or more acceleration structures as described above with reference to FIGS. 1-6. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:
in response to receiving a request to render a scene, generating, at an accelerated processing unit, a bounding volume based on the scene;
performing, by a compute unit of the accelerated processing unit, a spatial test on the bounding volume based on a set of planes;
storing one or more flags based on the spatial test, wherein each flag of the one or more flags indicates whether the bounding volume intersects a corresponding plane of the set of planes; and
rendering, by the accelerated processing unit, the scene based on the one or more of flags.

2. The method of claim 1, further comprising:
defining a frustum of the scene based on the set of planes; and
using the frustum of the scene for the spatial test.

3. The method of claim 2, wherein the frustum comprises an unbounded shape in the scene.

4. The method of claim 2, wherein the spatial test of the bounding volume comprises:
in response to the bounding volume being at least partially within the frustum of the scene, storing a flag indicating the bounding volume is at least partially within the frustum of the scene.

5. The method of claim 1, wherein the scene is rendered based on one or more physic operations using the one or more flags.

6. The method of claim 1, wherein the spatial test is performed by a lane of the compute unit.

7. A method, comprising:
in response to receiving a request to render a scene, assigning a corresponding bounding volume of one or more bounding volumes based on the scene to each lane of a plurality of lanes of a compute unit;
performing, by each lane of the plurality of lanes of the compute unit, a respective spatial test of an assigned bounding volume based on a corresponding set of planes;
storing, by each lane of the plurality of lanes, a set of flags based on the respective spatial test of the assigned bounding volume, wherein each flag of the set of flags indicate whether the assigned bounding volume intersects a respective plane of the corresponding set of planes; and
rendering the scene based on the sets of flags.

8. The method of claim 7, wherein each bounding volume is in a respective acceleration structure.

9. The method of claim 7, wherein two or more lanes of the plurality of lanes of the compute unit are assigned different bounding volumes.

10. The method of claim 7, further comprising:
defining a plurality of frustums of the scene from a plurality of sets of planes; and
selecting, by each lane of the plurality of lanes of the compute unit, a respective
frustum of the scene of the plurality of frustums of the scene to perform a respective spatial test.

11. The method of claim 10, wherein each lane of the plurality of lanes of the compute unit selects a same frustum of the scene from the plurality of frustums of the scene.

12. The method of claim 10, wherein two or more lanes of the plurality of lanes of the compute unit select different frustums of the scene from the plurality of frustums.

13. The method of claim 7, wherein a respective spatial test of an assigned bounding volume comprises:
in response to the assigned bounding volume being at least partially within a frustum of the scene, storing a flag indicating the assigned bounding volume is at least partially within the frustum of the scene.

14. An accelerated processing unit comprising:
a plurality of compute units each including circuitry configured to:
select a set of planes in a scene for performing a spatial test;
perform the spatial test of a bounding volume of a scene to be rendered by determining whether the bounding volume intersects with one or more planes of the set of planes in the scene; and
store a set of flags based on the spatial test, wherein;
each flag of the set of flags indicates whether the bounding volume intersects a corresponding plane of the set of planes; and
the accelerated processing unit is configured to render the scene based on the set of flags.

15. The accelerated processing unit of claim 14, wherein the accelerated processing unit is configured to:
define the set of planes in the scene based on a set of plane equations.

16. The accelerated processing unit of claim 14, wherein the respective set of planes selected by each compute unit of the plurality of compute units form a corresponding frustum.

17. The accelerated processing unit of claim 16, wherein the plurality of compute units each include circuitry configured to:
in response to the bounding volume not being at least partially within the corresponding frustum, store a flag indicating the bounding volume is not within the corresponding frustum.

18. The accelerated processing unit of claim 17, wherein the scene is rendered based on the flag.

19. The accelerated processing unit of claim 14, wherein at least one plane of the set of planes in the scene is an exclusive plane such that, based on the bounding volume intersecting the exclusive plane, a compute unit of the plurality of compute units stores a flag indicating that the spatial test has failed.

* * * * *